(12) United States Patent
Kroo et al.

(10) Patent No.: US 11,407,509 B2
(45) Date of Patent: Aug. 9, 2022

(54) TILT-WING AIRCRAFT

(71) Applicant: Wisk Aero LLC, Mountain View, CA (US)

(72) Inventors: Ilan Kroo, Portola Valley, CA (US); Herve Martins-Rivas, Mountain View, CA (US); Eric Allison, Mountain View, CA (US)

(73) Assignee: Wisk Aero LLC, Mountain View, CA (US)

( * ) Notice: Subject to any disclaimer, the term of this patent is extended or adjusted under 35 U.S.C. 154(b) by 227 days.

(21) Appl. No.: 16/744,064

(22) Filed: Jan. 15, 2020

(65) Prior Publication Data

US 2020/0156781 A1 May 21, 2020

Related U.S. Application Data

(63) Continuation of application No. 15/717,716, filed on Sep. 27, 2017, now Pat. No. 10,562,620.

(60) Provisional application No. 62/401,032, filed on Sep. 28, 2016.

(51) Int. Cl.
*B64C 29/00* (2006.01)
*B64C 3/38* (2006.01)
*B64C 11/00* (2006.01)

(52) U.S. Cl.
CPC .......... *B64C 29/0033* (2013.01); *B64C 3/385* (2013.01); *B64C 11/001* (2013.01)

(58) Field of Classification Search
CPC .... B64C 29/0033; B64C 11/001; B64C 3/385
See application file for complete search history.

(56) References Cited

U.S. PATENT DOCUMENTS

| | | |
|---|---|---|
| 3,065,929 A | 11/1962 | Holland, Jr. |
| 3,093,347 A | 6/1963 | Fowler |
| 3,181,810 A | 5/1965 | Olson |
| 3,201,068 A | 8/1965 | Miller et al. |
| 8,271,151 B2 | 9/2012 | Hasan et al. |

(Continued)

FOREIGN PATENT DOCUMENTS

CN 205440867 8/2016

OTHER PUBLICATIONS

International Search Report and Written Opinion—PCT/US2017/053796—ISA/EPO—dated Dec. 28, 2017.

(Continued)

*Primary Examiner* — Valentina Xavier
(74) *Attorney, Agent, or Firm* — Kilpatrick Townsend & Stockton LLP

(57) ABSTRACT

In various embodiments, a tilt-wing aircraft includes a fuselage; a first wing tiltably mounted at or near a forward end of the fuselage; and a second wing rotatably mounted to the fuselage at a position aft of the first wing. A first plurality of rotors is mounted on the first wing at locations on or near a leading edge of the first wing, with two or more rotors being mounted on wing portions on each side of the fuselage; and a second plurality of rotors mounted on the second wing at locations on or near a leading edge of the second wing, with two or more rotors being mounted on wing portions on each side of the fuselage. A flight control system generates a set of actuators and associated actuator parameters to achieve desired forces and moments.

18 Claims, 7 Drawing Sheets

(56) References Cited

U.S. PATENT DOCUMENTS

| | | | |
|---|---|---|---|
| 8,733,690 B2* | 5/2014 | Bevirt | B64C 29/0033 244/12.4 |
| 9,120,560 B1* | 9/2015 | Armer | B64C 29/0025 |
| 9,475,579 B2* | 10/2016 | Fredericks | B64C 29/0033 |
| 10,301,016 B1* | 5/2019 | Bondarev | B64C 29/0033 |
| 10,562,620 B2 | 2/2020 | Kroo et al. | |
| 10,807,707 B1* | 10/2020 | Ter Keurs | B64D 9/00 |
| 11,126,203 B2* | 9/2021 | McCullough | B64C 27/30 |
| 11,130,568 B2* | 9/2021 | Morris | B64C 29/0033 |
| 2003/0094537 A1 | 5/2003 | Austin-Brown | |
| 2008/0237392 A1* | 10/2008 | Piasecki | G05D 1/0858 244/6 |
| 2009/0048722 A1* | 2/2009 | Piasecki | B64C 27/82 701/3 |
| 2009/0302170 A1* | 12/2009 | Rozovski | B64C 29/0033 244/221 |
| 2011/0202291 A1* | 8/2011 | Hickman | G01P 5/14 702/50 |
| 2011/0315806 A1* | 12/2011 | Piasecki | B64D 17/80 244/2 |
| 2015/0014475 A1 | 1/2015 | Taylor et al. | |
| 2015/0360775 A1* | 12/2015 | Arai | B64C 15/02 244/12.1 |
| 2016/0304190 A1* | 10/2016 | Groh | B64C 27/605 |
| 2017/0036753 A1* | 2/2017 | Shue | G05D 1/0858 |
| 2017/0174342 A1* | 6/2017 | Huang | B64C 29/0033 |
| 2018/0057157 A1* | 3/2018 | Groninga | B64C 39/008 |
| 2018/0208305 A1* | 7/2018 | Lloyd | B60L 50/61 |
| 2020/0010182 A1* | 1/2020 | Renteria | A63H 27/02 |

OTHER PUBLICATIONS

U.S. Appl. No. 15/717,716, "Notice of Allowance", dated Sep. 23, 2019, 6 pages.

PCT/US2017/053796, "International Preliminary Report on Patentability", dated Apr. 11, 2019, 7 pages.

* cited by examiner

US 11,407,509 B2

TILT-WING AIRCRAFT

CROSS REFERENCE TO OTHER APPLICATIONS

This application is a continuation of U.S. Non-Provisional patent application Ser. No. 15/717,716 entitled TILT-WING AIRCRAFT filed on Sep. 27, 2017 which claims priority to U.S. Provisional Patent Application No. 62/401,032 entitled TILT-WING AIRCRAFT filed Sep. 28, 2016 which are incorporated herein by reference in their entirety for all purposes.

BACKGROUND OF THE INVENTION

Fixed wing aircraft typically require relatively long runways to take off and land. Helicopters do not require runways, but typically they have relatively complicated rotors and associated control systems, to enable the aircraft to take off and land and also to fly in forward flight (e.g., collective and cyclic rotor pitch controls).

Existing vertical takeoff and landing (VTOL) aircraft may be too heavy and complicated for uses such as a personal aircraft.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A tilt-wing aircraft that efficiently transitions to forward flight is disclosed. In various embodiments, one or more of a set of rotors/fans may be positioned in a housing that directs flow over a wing and/or an aerodynamic control surface in a manner that ensures a required lift and/or thrust is provided. In some embodiments, air flow is directed over a wing during a transition from vertical/short take off to forward flight.

Figure 1A:
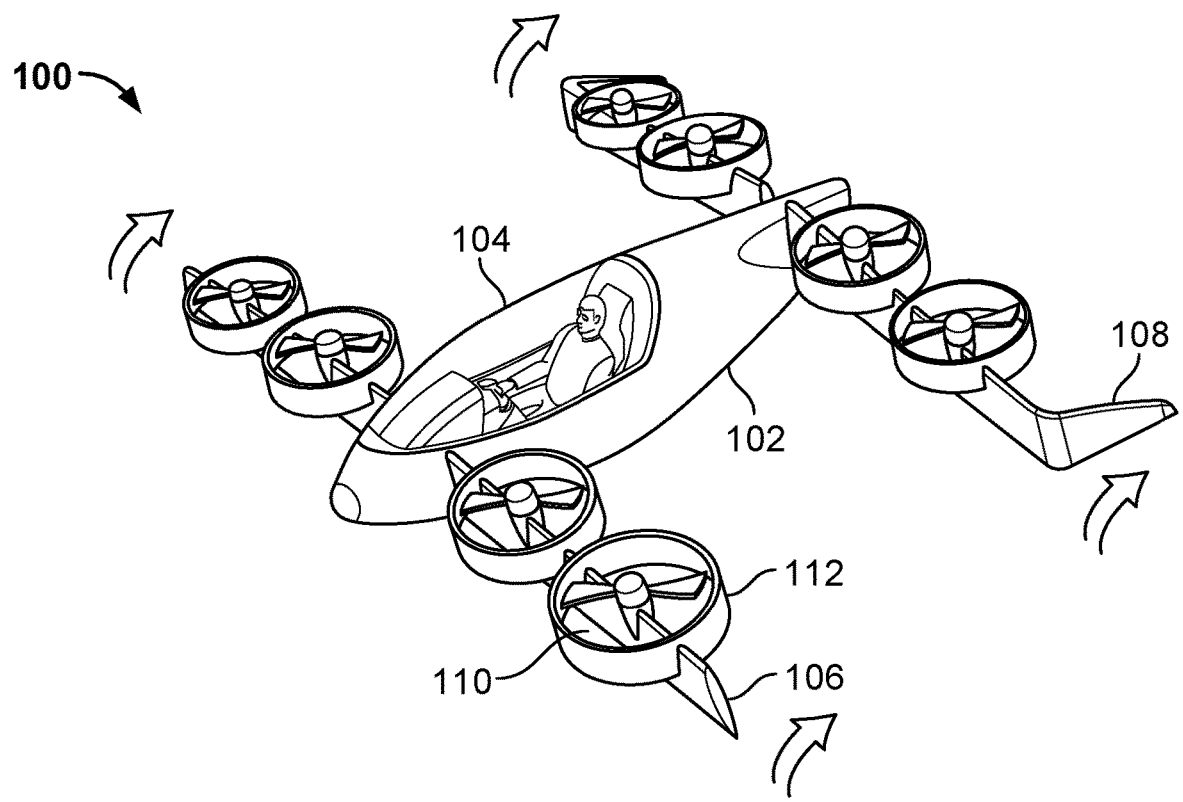
FIG. 1A is a diagram showing in perspective view an embodiment of a tilt-wing aircraft.
Figure 1B:
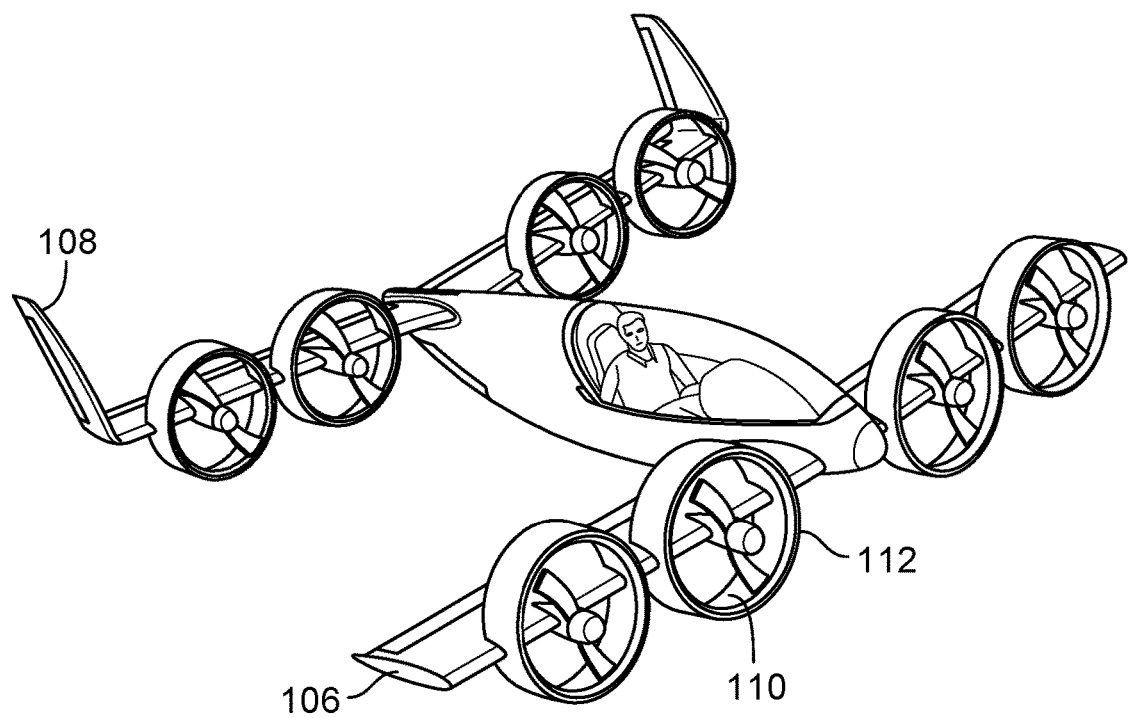
FIG. 1B is a diagram showing the tilt-wing aircraft of FIG. 1A with wings in a forward flight position.

FIG. 1A is a diagram showing in perspective view an embodiment of a tilt-wing aircraft. In the example shown, tilt-wing aircraft 100 includes a fuselage 102 and a cabin section 104. A forward wing 106 and an aft wing 108 are rotatably mounted to the fuselage 102. In various embodiments, motors and coupling mechanisms not shown in FIG. 1A are provided and used under control of a flight control system (not shown) to rotate wings 106 and 108 from the vertical position, as shown in FIG. 1A, to a forward flight position, as shown in FIG. 1B. Forward wing 106 and aft wing 108 each have four electric motor-driven rotors (also known in various embodiments as "fans", "lift fans", or "propellers") 110 mounted thereon, two on each side of fuselage 102. In the example shown, rotors 110 are mounted in a fixed position relative to the wings 106, 108, on a leading edge of wings 106, 108.

In various embodiments, rotors 110 may be driven by electric motors (not shown) mounted adjacent to each rotor 110. Electric motors are well suited to a distributed propulsion application where a plurality of small motors are used to drive small, high RPM, propellers as opposed to fewer high power motors driving larger and slower propellers. While internal combustion engines get more efficient at large scale, small electric motors can be make very efficient and light weight. They are also composed of a small number of moving parts and are therefore very robust. In various embodiments, use of electric motors to drive rotors 110 of aircraft 100 enables a smaller, lighter weight VTOL aircraft to be provided.

In the example shown in FIGS. 1A and 1B, each rotor 110 is surrounded by a housing 112. In the example shown, the respective housings 112 are shown as being mounted and partly integrated into the leading edge of wings 106, 108. In various embodiments, the housings 112 may serve to protect a pilot or other user of aircraft 100 from accidental contact with rotors 110, or piece or other debris that may be thrown by rotors 110. In some embodiments, the housing 112 may extend further into (i.e., in the direction of a trailing edge) of the wings 106, 108. The housing 112 may function as an inlet/intake structure, directing the flow of air into the rotors 110. In some embodiments, a portion of housing 112 may extend beyond a trailing edge/side of the rotor 110, i.e., the rotor outlet side, and may be shaped and/or positioned to direct airflow generated by the rotor 110 over the wing 106, 108 and/or an aerodynamic control surface, such as an aileron, position at or near a trailing edge of the wing. In various embodiments, the aileron or other control surface may be manipulated under control of a flight control system of the tilt-wing aircraft, e.g., to achieve or maintain a desired (e.g., minimum) amount and/or direction of lift, for example as the aircraft transition to forward flight mode.

In the example shown in FIG. 1, the forward and aft wings 106, 108 are approximately equal in length. A tandem wing design where both the forward (front) wing, sometimes called a "canard", and aft wing carry substantial portions of the total lift is well suited for a small, compact, vertical or short takeoff vehicle. The structure of the two wings allows mounting points for a plurality of motors that can be distributed in a way that the geometric center of the motors is close to the airplane center of gravity, therefore providing efficient load distribution and better resilience to potential motor failure. Moreover, while a traditional horizontal tail usually requires a larger airplane length, a tandem wing airplane is typically shorter in length. This type of wing arrangement also provides good aerodynamic efficiency at high speed and can generally be designed such that the stall characteristics are good.

Figure 2:
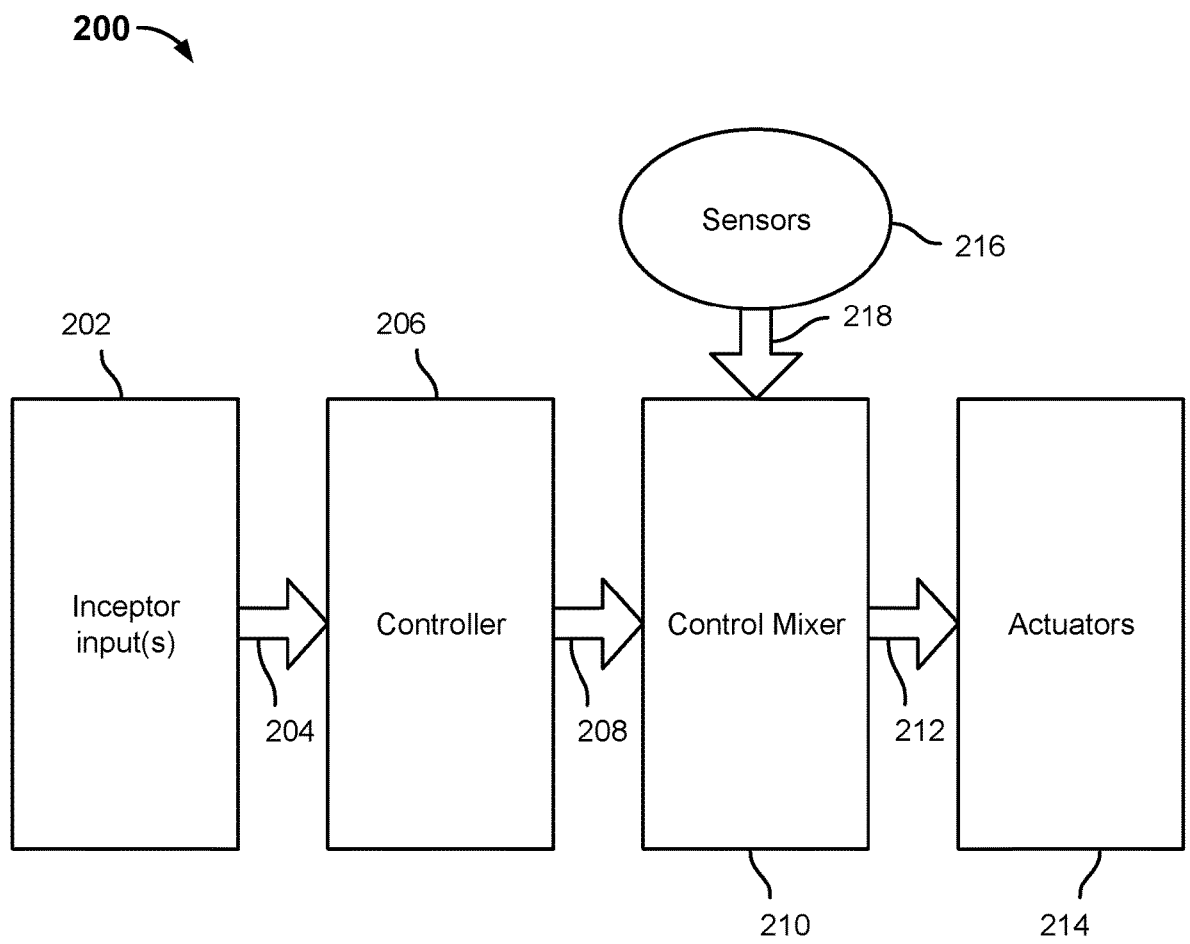
FIG. 2 is a block diagram illustrating an embodiment of a flight control system.

FIG. 2 is a block diagram illustrating an embodiment of a flight control system. In the example shown, flight control system 200 includes a set of inceptors 202, such as throttle, stick, or other manual input devices, configured to generate a set of inceptor inputs 204, e.g., a set of roll, pitch, yaw, and/or throttle commands or signals. A controller 206 interprets the inceptor inputs 204 and computes and provides as output a corresponding set of forces and moments 208. For example, forces in and moments about each of three axes (e.g., x (forward direction/roll), y (side direction/pitch), and z (vertical direction/yaw) may be provided.

A control mixer 210 receives force/moments 208 and generates a set of actuators and actuator parameters 212, which are provided to actuators 214 to maneuver and propel the aircraft. Examples of actuators include, without limitation, rotors, fans, and propellers, such as rotors 110 of FIGS. 1A and 1B, and aerodynamic control surfaces, such as ailerons, elevators, and rudders. For example, each of the rotors 110 in the example shown in FIGS. 1A and 1B may receive a corresponding thrust (speed) command, to control the attitude of the aircraft (e.g., orientation relative to horizontal or ground) and the speed of the aircraft in one or more directions (e.g., upward during vertical flight mode, as during takeoff, or forward in forward flight).

In the example shown in FIG. 2, control mixer 210 receives from one or more sensors 216 sensor data 218. In various embodiments, the sensor data 218 may be used by control mixer 210 to determine the actuators/parameters 212 to be provided as output to achieve (to an extent practical) a requested set of forces/moments 208. For example, air temperature, electric motor temperature, airspeed of the aircraft, etc. may be measured by sensors 216 and provides as sensor data 218. Such sensor data may be used by control mixer 210 to determine which actuators are available and/or for each its effectiveness under the sensed conditions indicated by the sensor data 218.

In various embodiments, flight control system 200 comprises one or more processors configured to perform the processing and control functions described above as being performed by the controller 206 and/or control mixer 210.

Figure 3:
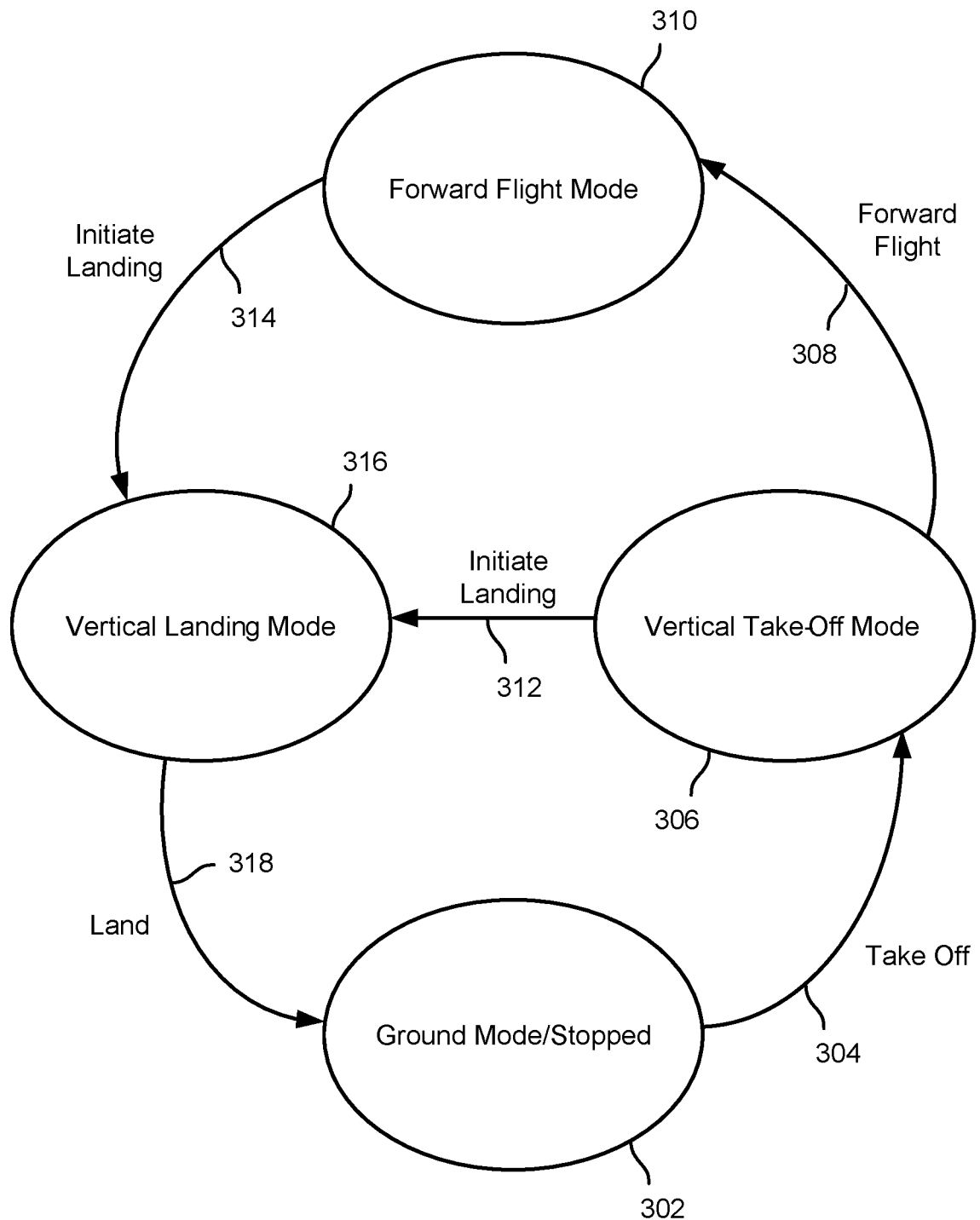
FIG. 3 is a state diagram illustrating transitions of a tilt-wing aircraft in various embodiments.

FIG. 3 is a state diagram illustrating transitions of a tilt-wing aircraft in various embodiments. In various embodiments, a flight control system such as the flight control system 200 of FIG. 2 may be configured to control the actuators (rotors, aerodynamic control surfaces) of the aircraft to cause the aircraft to transition between and operate within operational states or modes as shown in FIG. 3.

In the example shown, the aircraft may transition from ground mode/stopped state 302 through a takeoff transition/ sequence 304 to enter a vertical (or short) takeoff mode/state 306. An example of a tilt-wing aircraft in takeoff mode 306 is shown in FIG. 1A. From the takeoff mode 306, the aircraft may transition via a vertical-to-forward flight transition 308 to a forward flight mode 310. An example of a tilt-wing aircraft in forward flight mode 310 is shown in FIG. 1B.

From vertical takeoff mode 306 a transition 312 directly to vertical landing mode 316 may be made. Alternatively, vertical landing mode 316 may be entered from forward flight mode 310 via transition 314. For example, a button or other control to initiate landing may be activated by the pilot. In various embodiments, a tilt-wing aircraft in vertical landing mode 316 appears as shown in FIG. 1A, i.e., wings rotated to vertical flight position.

From the vertical landing mode 316, the aircraft transitions via a landing approach/sequence 318 back to the ground mode 302.

Figure 4:
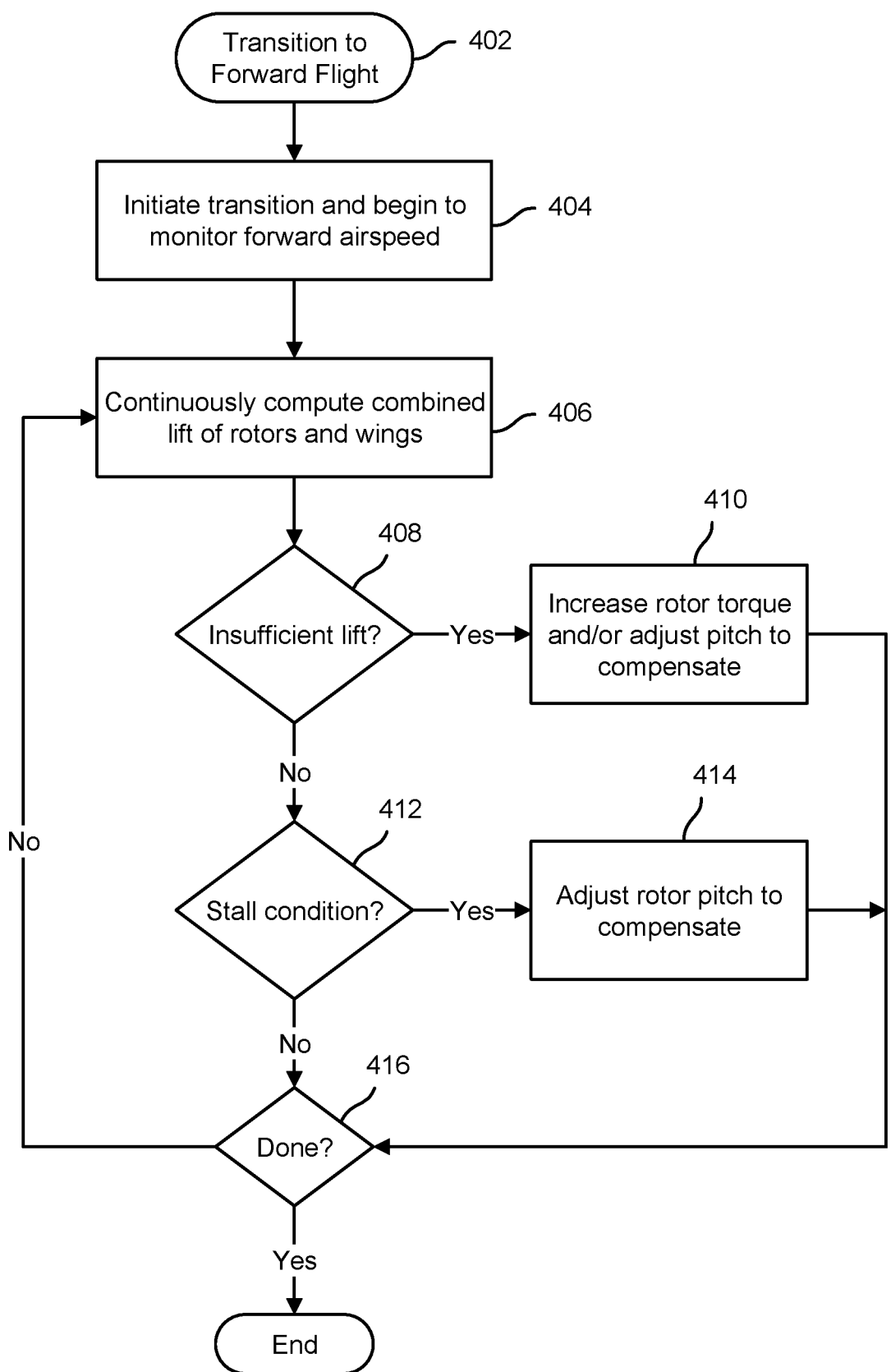
FIG. 4 is a flow chart illustrating an embodiment of a process to control flight of a tilt-wing aircraft through a transition between vertical and forward flight.

FIG. 4 is a flow chart illustrating an embodiment of a process to control flight of a tilt-wing aircraft through a transition between vertical and forward flight. In the example shown, an indication to transition to forward flight is received (402). In response, a transition to forward flight is initiated and forward airspeed begins to be monitored (404). A combined lift generated by the aircraft's rotors and wings is computed/updated continuously (406). For example, as the wings are tilted to the horizontal position for forward flight and as forward speed of the aircraft through the air increases, the lift generated by the wings may increase while the lift generated by the rotors may decreases absent changes to the rotor torque (and/or speed, thrust, etc.). If an insufficient lift condition is detected (408), rotor torque and/or pitch may be adjusted to compensate (410), e.g., to generate a higher upward force component. Variable pitch propellers (rotors) have a mechanism that allows dynamically changing the incidence of the blades. This allows such a propeller to generate thrust more efficiently through a wide range of airspeeds. This characteristic of a variable pitch propeller (rotor) may be especially relevant for a VTOL or STOL airplane that operates over a wide range of airspeeds. If a rotor stall condition is detected (412), rotor pitch may be adjusted to compensate (414). Adjustments to rotor torque and/or pitch are made, as required, until the transition to forward flight has been completed (416), e.g., the wings have been rotated fully to the horizontal position, and forward airspeed is sufficient for the wings to generate sufficient lift to maintain altitude.

For variable pitch rotors, thrust can be increased either by changing rotor RPM or by changing rotor pitch or a combination of both. Advantages of using pitch for actuation include the fact that it can be very fast to respond to commands. Most notably, it allows fast actuator response around zero thrust and allows the rotor to quickly generate negative thrust without reversing RPM. This can be used to generate desired moments in roll, pitch or yaw about the vehicle center of gravity.

In various embodiments, the aircraft control system commands both rotor speed and pitch to ensure fast actuator response as well as efficient, low power, operation.

In some embodiments, the variable pitch system is slow so that weight is minimized. Consequently, rotor pitch is not commanded to vary at high bandwidth but slowly changed based on sensor readings such as airspeed to allow for efficient operations and increase the achievable maximum airspeed. In that case, high bandwidth actuation is achieved by varying RPM.

FIG. 4 is an example of a control system that may be used in various embodiments to transition a tilt-wing aircraft as disclosed herein between vertical (e.g., takeoff, landing, and/or hover) and forward flight. In various embodiments, one or more portions of the process of FIG. 4 may be omitted. For example, steps 412 and 414 may be omitted in some embodiments. In some embodiments, transition to forward flight may be effected by attaining a desired (e.g., design minimum or greater) altitude and rotating the wings substantially continuously to a forward flight position, while adjusting power to the rotors as required to maintain stability and altitude while increasing forward airspeed as the wings are rotated into the forward flight position and begin to generate sufficient lift to maintain altitude.

Figure 5A:
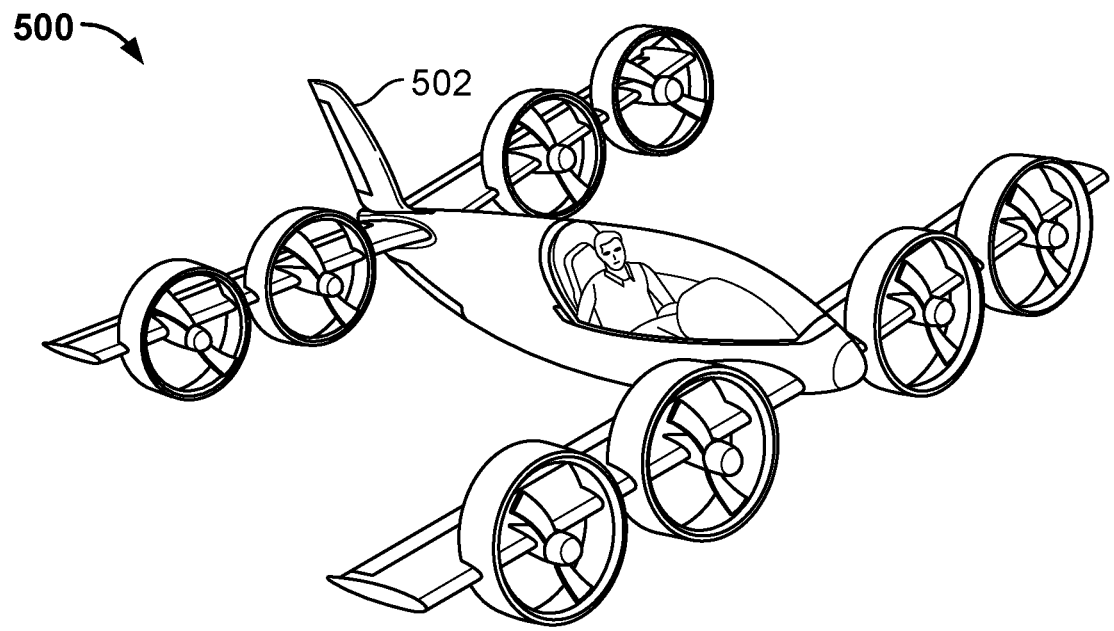
FIGS. 5A, 5B, and 6 show variations to the aircraft 100 of FIGS. 1A and 1B.
Figure 5B:
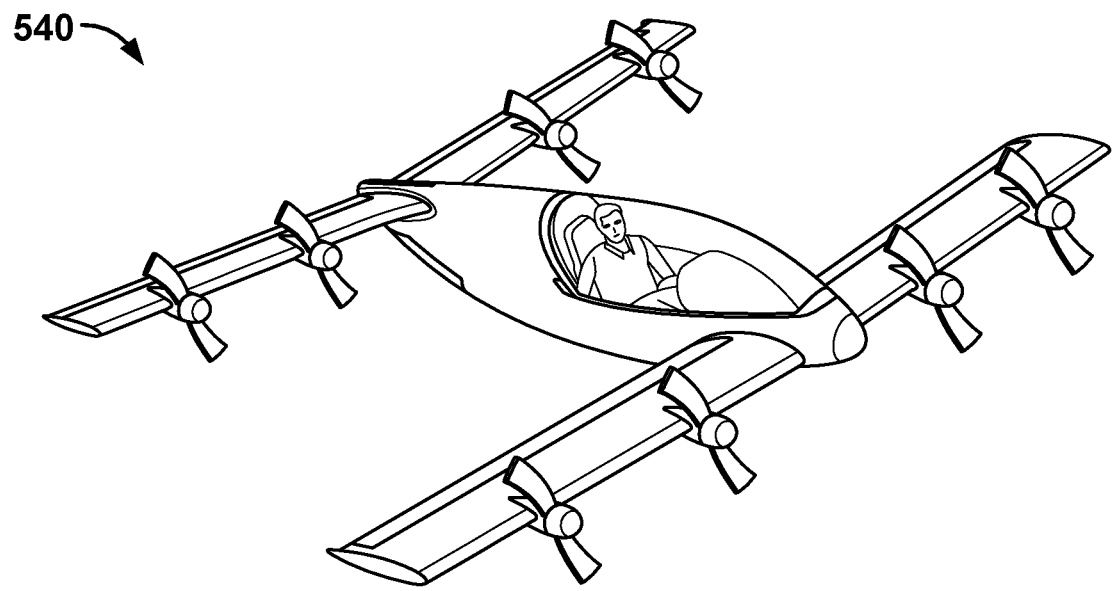
Figure 6:
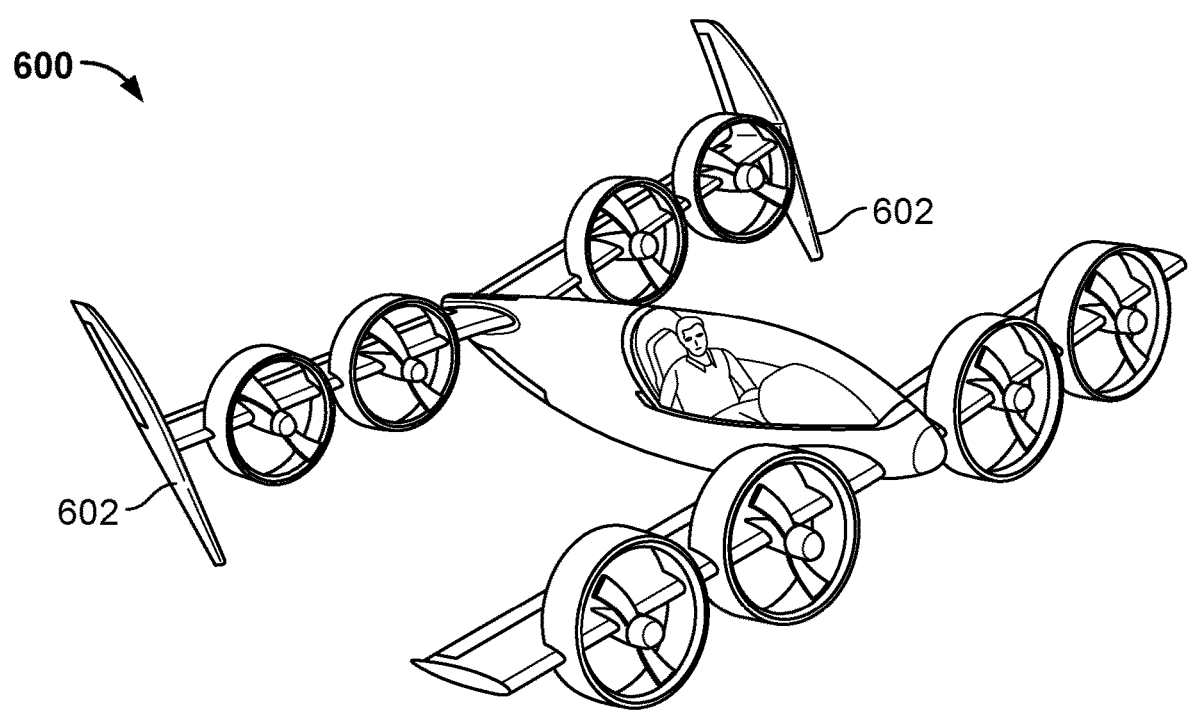

FIGS. 5A, 5B, and 6 show variations to the aircraft 100 of FIGS. 1A and 1B. In the aircraft 500 of FIG. 5A, the tail structures shown in FIGS. 1A and 1B as being position on each outer end of the aft wing 108 has been replaced with a single, centrally located tail 502. The aircraft 540 of FIG. 5B does not include a tail structure and omits the ducts/shrouds around the rotors. Yaw control is maintained by using a flight control system to vary rotor speed/torque as required.

In the aircraft 600 of FIG. 6, the tail structures shown in FIGS. 1A and 1B as being position on each outer end of the aft wing 108 have been augmented 602 to extend below the aft wing 108, in addition to above.

In various embodiments disclosed herein, ducts/shrouds may be included or not, depending on the extent to which such ducts/shrouds may be required or desired for safety, e.g., to prevent human contact with rotor blades, and/or to direct flow, e.g., across a control surface. Likewise, tail structures may be included or not, as desired. In various embodiments, features shown in a given embodiment may be mixed and matched with features shown in one or more other embodiments to provide a tilt wing aircraft within the scope of the present disclosure. In addition, while a number of aircraft shown in the figures and/or described herein have eight rotors, i.e., two per wing, in various embodiments more or fewer rotors may be included, such fewer (e.g., 4) or more (e.g., 10, 12, etc.) rotors. While in some embodiments, control surfaces such as ailerons and rudders, are shown, in various embodiments other or different control surfaces may be included and/or such control surfaces may be omitted entirely and a flight control system may be used to maintain aircraft stability and position (attitude) using only the rotors.

Figure 7:
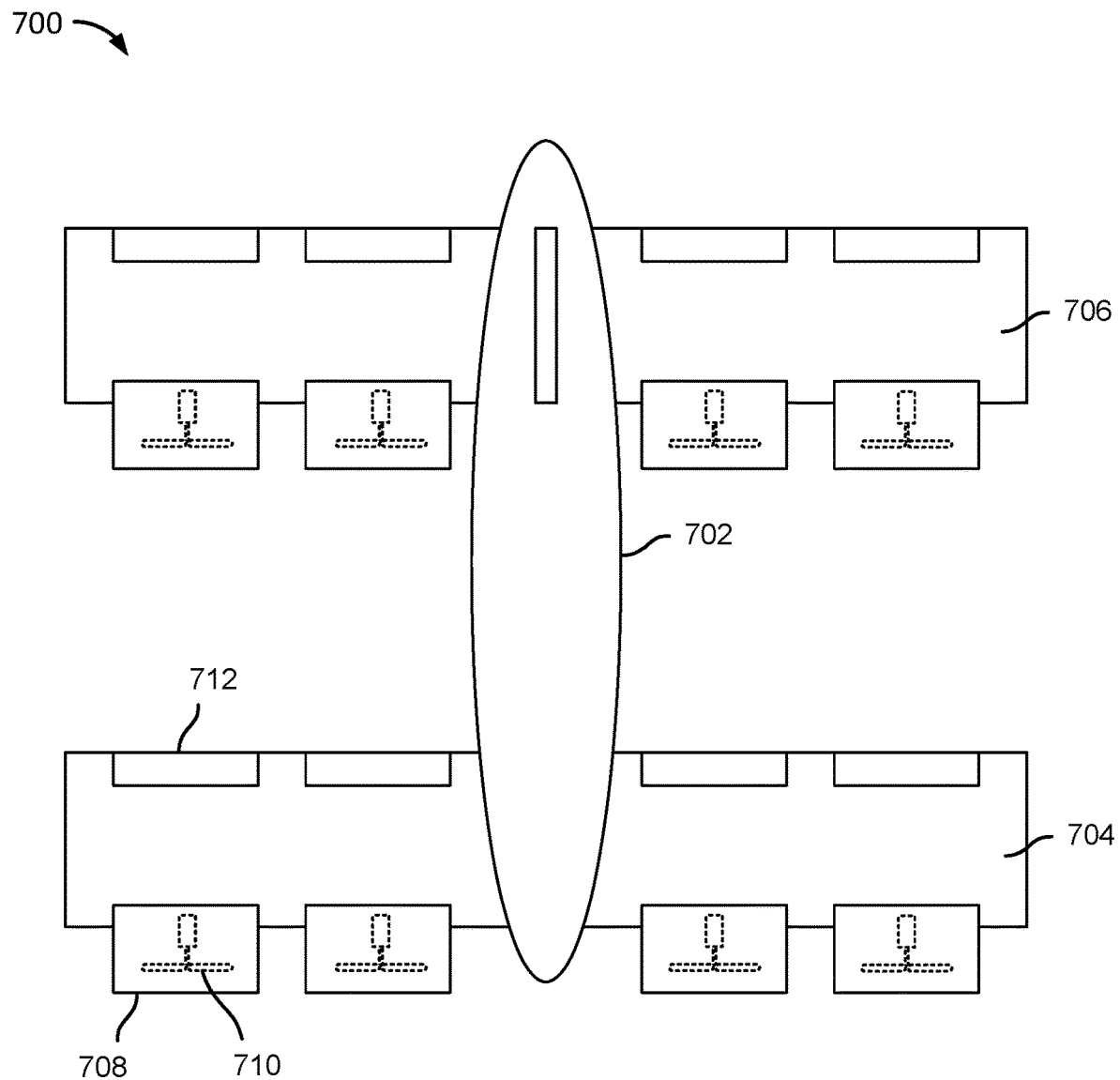
FIG. 7 is a block diagram illustrating an embodiment of a tilt-wing aircraft.

FIG. 7 is a block diagram illustrating an embodiment of a tilt-wing aircraft. In the example shown, the aircraft 700 includes structures similar to those shown in FIGS. 1A and 1B. Each of the wings 704 and 706 affixed to fuselage 702 has a set of four housings 708 and associated rotor assemblies 710, comprising rotors and associated electric motors. In addition, behind each housing 708 and rotor assembly 710, there is a rotor-specific aerodynamic control surface 712. In various embodiments, each of the eight aerodynamic control surfaces 712 is independently controlled. Each may be positioned at an assigned angle relative to the wing 704, 706, e.g., to control and/or direct flow from the associated rotor assembly 710 over the portion of the wing on which the control surface 712 is mounted and/or to control, for a given speed or torque of the rotor assembly 710 an amount and/or direction of lift that is generated and/or contributed.

In some embodiments, in vertical flight modes, the control surfaces 712 may be used to provide attitude control, e.g., yaw control, by deflecting the airflow (i.e., rotor wash) generated by the associated rotor assembly 710.

In some embodiments, aircraft control may be achieved with respect to one or more embodiments of a tilt-wing aircraft as disclosed herein solely by computing and applying a corresponding thrust or other command or control input to and/or with respect to each of a plurality of lift fans. In some embodiments, having a forward and aft wing of a tandem wing tilt-wing aircraft, as disclosed in various embodiments described herein, facilitates control using only lift fans, e.g., by enabling a desired/requested moment about one or more axes, such as a pitch axis, to be applied using only lift fans. In some embodiments, no aerodynamic control surfaces are included on a tilt-wing aircraft as disclosed herein, and only lift fans are used to provide control.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A tilt-wing aircraft, comprising:
a fuselage;
a first wing rotatably mounted at or near a forward end of the fuselage;
a second wing rotatably mounted to the fuselage at a position aft of the first wing;
wherein the first wing and the second wing each is coupled to the fuselage by a tilt mechanism configured to rotate about a lateral axis of the first wing and a lateral axis of the second wing of the tilt-wing aircraft between a vertical flight configuration and a forward flight configuration;
a first set of one or more rotors mounted on the first wing;
a second set of one or more rotors mounted on the second wing; and
a flight control system configured to:
determine a set of desired forces and moments based at least in part on a set of inceptor inputs;
receive sensor data;
generate, based at least in part on said sensor data and the set of desired forces and moments, a set of flight control actuators and associated actuator parameters; and
provide to each actuator in the set of flight control actuators based at least on the actuator parameters generated for that actuator, wherein the flight control system is configured to transition at least one of the first wing or the second wing from the vertical flight configuration to the forward flight configuration by:
continuously calculating a combined lift of at least one of the first set of rotors or the second set of rotors;
calculating a required lift based at least in part on the set of inceptor inputs;
comparing the combined lift to the required lift; and
continuously adjusting a pitch of the tilt-wing aircraft and a rotor torque of at least one of the first set of rotors or the second set of rotors based on the comparing until the transition to the forward flight configuration is completed.

2. The tilt-wing aircraft of claim 1, wherein each of said rotors includes a housing configured to direct airflow generated by the each of the rotors across an associated aerodynamic surface.

3. The tilt-wing aircraft of claim 2, wherein the associated aerodynamic surface comprises a movable aerodynamic control surface mounted on a trailing edge of a corresponding one of the first wing or the second wing.

4. The tilt-wing aircraft of claim 2, wherein the associated aerodynamic surface comprises an aileron.

5. The tilt-wing aircraft of claim 1, wherein the set of flight control actuators includes one or more aerodynamic control surfaces.

6. The tilt-wing aircraft of claim 1, wherein the first set of one or more rotors and the second set of one or more rotors have variable pitch rotor blades.

7. The tilt-wing aircraft of claim 6, wherein the flight control system is further configured to vary a pitch of the first set of one or more rotors and the second set of one or more rotors.

8. A method of controlling a tilt-wing aircraft performed by one or more processors, the method comprising:
receiving one or more inceptor inputs;
receiving a plurality of sensor data from one or more sensors;
interpreting the one or more inceptor inputs to compute a corresponding set of forces and moments for the tilt-wing aircraft;
receiving, by a control mixer, the corresponding set of forces and moments at a control mixer;
generating, by the control mixer, a set of actuator parameters to achieve the corresponding set of forces and moments;
driving one or more flight control actuators according to the set of actuator parameters;
transitioning the tilt-wing aircraft from a vertical flight configuration to a forward flight configuration by:
continuously calculating a combined lift of rotors and wings of the tilt-wing aircraft;
calculating a required lift based at least in part on the set of inceptor inputs;
comparing the combined lift to the required lift; and
continuously adjusting a pitch of the tilt-wing aircraft and a rotor torque of the rotors based on the comparing until the transition to the forward flight configuration is completed.

9. The method of claim 8, wherein the one or more inceptor inputs comprises at least one of a set of roll, pitch, yaw, or throttle commands or signals.

10. The method of claim 8, wherein the one or more sensors comprises at least one of an airspeed sensor, air pressure sensor, outside air temperature sensor, or electric motor temperature sensor.

11. A tilt-wing aircraft, comprising:
a fuselage;
a first wing tiltably mounted at or near a forward end of the fuselage;
a second wing rotatably mounted to the fuselage at a position aft of the first wing, wherein each of the first wing and the second wing is coupled to the fuselage by a tilt mechanism configured to rotate about a lateral axis of the tilt-wing aircraft the first wing or the second wing between a vertical flight configuration and a forward flight configuration;
a first set of one or more rotors mounted on the first wing;
a second set of one or more rotors mounted on the second wing;
one or more sensors; and
a flight control system configured to control at least one of:
movement of one at least one of the first wing and the second wing; and
rotational speed of each rotor individually of the first set of one or more rotors and the second set of one or more rotors,
wherein the flight control system is further configured to transition at least one of the first wing or the second wing from the vertical flight configuration to the forward flight configuration by:
continuously calculating a combined lift of at least one of the first set of rotors or the second set of rotors;
calculating a required lift based at least in part on the set of inceptor inputs;
comparing the combined lift to the required lift;
continuously adjusting a pitch of the tilt-wing aircraft and a rotor torque of at least one of the first set of rotors or the second set of rotors based on the comparing until the transition to the forward flight configuration is completed;
detecting a stall condition based at least in part on one or more inceptor inputs and information received from the one or more sensors; and
increasing the rotor torque, if the stall condition exists based at least in part on a measured pitch of the tilt-wing aircraft.

12. The tilt-wing aircraft of claim 11, wherein the first wing is mounted forward of a center of gravity of the fuselage.

13. The tilt-wing aircraft of claim 11, wherein the second wing is mounted aft of a center of gravity of the fuselage.

14. The tilt-wing aircraft of claim 11, wherein the second wing includes on each end a vertically oriented tail portion.

15. The tilt-wing aircraft of claim 14, further comprising a rudder positioned at a trailing edge of each tail portion.

16. The tilt-wing aircraft of claim 11, wherein the first wing and the second wing are of comparable length.

17. The tilt-wing aircraft of claim 11, wherein the first set of one or more rotors and the second set of one or more rotors are variable pitch rotors.

18. The tilt-wing aircraft of claim 17, wherein the flight control system is further configured to control pitch of the variable pitch rotors.

* * * * *